Nov. 1, 1960 R. ROSEBROOK 2,958,340

SPOOL VALVE

Filed Dec. 17, 1956

INVENTOR.
ROY ROSEBROOK
BY D. Gordon Angus
ATTORNEY.

United States Patent Office
2,958,340
Patented Nov. 1, 1960

2,958,340

SPOOL VALVE

Roy Rosebrook, Montebello, Calif., assignor, by mesne assignments, to Banstrom Industries, Inc., Los Angeles, Calif., a corporation of Connecticut Filed Dec. 17, 1956, Ser. No. 628,820

1 Claim. (Cl. 137—622)

This invention relates to spool valves, and to a method for making the same.

An object of this invention is to provide a spool valve which is particularly suited for controlling hydraulic rams in the operation of machine tools, such as milling machines, for example.

Spool valves are well-known components for the control of hydraulic fluid flow. Such valves comprise an outer cylindrical sleeve, having a pair of inner circumferential grooves therein. These sleeve grooves are usually connected to opposite ends of a cylinder in a double-action hydraulic ram. A pair of exhaust grooves are also usually formed in the inner wall of the sleeve, on opposite sides of the pair of sleeve grooves.

A spool is fitted in the cylindrical sleeve so that it is coaxial therewith, and so that it can be moved axially therein. This spool is usually provided with several grooves and lands which intersect to form edges at the periphery of the spool. One of the grooves in the spools is in fluid communication with a source of pressurized fluid, and the others are connected to an exhaust port.

Overlapping of the aforesaid edges shuts off fluid flow between grooves, and this overlapping is caused by relative axial shifting of the spool and the sleeve. According to this invention, one of said edges has points thereon which are axially spaced apart, so that a gradual opening and closing of the valve results from said relative movement.

The above and other features of this invention will be fully understood from the following detailed description and the accompanying drawings, of which:

Fig. 1 is an elevation, partly in cross-section, showing a machine tool installation incorporating a spool valve according to this invention;

Figs. 2 and 3 are partial cross-sections taken at lines 2—2 and 3—3, respectively, of Fig. 1;

Figure 1:
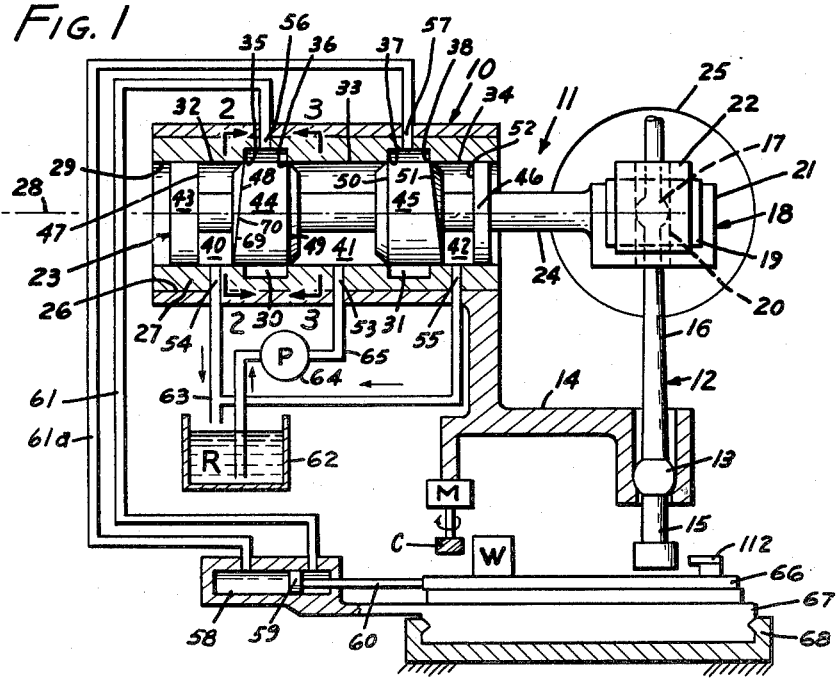
Figure 2:
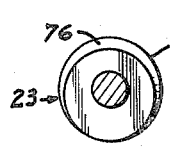
Figure 3:
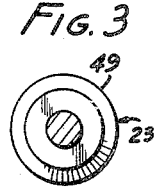

In Fig. 1 there is shown a valve 10 according to this invention, incorporated into a control system for a machine tool. This valve is particularly suited for such an application, as a component portion of a tracer valve 11. Tracer valves are useful for the control of movement of a duplicating machine, such as a milling machine controlled by the tracer valve to duplicate the contour of a template. A full description of a tracer valve of this type, and of a machine tool control system in which it is useful may be found in Rosebrook Patent No. 2,753,145, issued July 3, 1956, entitled "Tracer Mechanism."

A stylus 12 is mounted by means of a ball-like member 13 to the housing 14 of the tracer valve 11. Pivotal movement of the lower pendular portion 15 of the stylus around the ball-like member 13 causes the upper portion 16 of the stylus to move in an opposite direction therefrom. The ball-like member 13 acts as a fulcrum.

In upper portion 16 of the stylus there is included a second ball-like member 17 to which a spool mounting device 18 is attached. Reference should be had to the aforementioned Rosebrook patent for more complete details of this spool mounting device. Briefly, this device includes a rectangular block 19 with a hole 20 therethrough. The second ball-like member 17 fits snugly in hole 20. This rectangular block has four outer planar surfaces which engage the legs of a pair of yokes 21, 22. These yokes are crossed, with their bights on opposite sides of the rectangular block so that all six sides of the block are contacted by a surface of one of the yokes. The yokes enclose the block. It will be seen that the yokes can slide in directions perpendicular to each other by virtue of a sliding movement between the legs of the yokes and the outer surfaces of the block. A valve spool 23 of valve 10 is affixed to yoke 21 by means of a rod 24 so that movement of the stylus and block in the plane of Fig. 1 shifts the valve spool 23 to the left or right in Fig. 1, depending on the direction of movement of the stylus tip.

A second valve spool 25 may conveniently be positioned at right angles to spool vlave 10 and be attached to yoke 22 by a rod (not shown) to respond to movements of the stylus in a direction perpendicular to the plane of Fig. 1. Spool 25 is part of a second spool valve (not shown) which is identical in construction and operation to valve 10, for controlling movements of the machine tool in a direction perpendicular to plane of Fig. 1. The tracer valve 11, by virtue of the mounting device 18, adjusts the machine tool in response to oblique tracer movement by causing each spool to move an amount proportional to its component in the direction of the individual spool valve.

The valve 10 may conveniently be incorporated integrally into the housing 14 of the tracer valve 11. For this purpose, a bore 26 is provided in the housing which bore receives a valve sleeve 27. This valve sleeve has an axis 28 and an internal cylindrical spool passage 29. Spool passage 29 has a wall in which sleeve grooves 30, 31 (sometimes called "motor supply grooves") are formed. These grooves leave sleeve lands 32, 33, 34, as the radially innermost portions of the inner wall of the cylindrical spool passage 29. As can be seen from the drawing, the sleeve grooves and the sleeve lands intersect to form edges 35, 36, 37 and 38.

Valve spool 23 is fitted within the cylindrical spool passage and is coaxial therewith, so that the valve sleeve and valve spool are axially reciprocable relative to each other. The valve spool 23 is provided with circumferential spool grooves 40, 41, and 42. These grooves leave spool lands 43, 44, 45 and 46 as the radially outermost portions of the spool. The spool grooves and spool lands intersect to form edges 47, 48, 49, 50, 51 and 52.

The spool lands and the sleeve lands are of substantially the same radius, and are coaxial, so that they make a substantially fluid sealing joint between them when they are disposed axially opposite each other. It will be seen from an examination of Fig. 1 that in some positions of the spool, portions of the lands will be opposite each other so that some edges overlap and fluid flow is prevented past the overlapping edges. In other spool positions, some edges do not overlap, and then some grooves will be in fluid communication with each other.

A pressure port 53 is drilled through the housing 14 and the valve sleeve so as to make fluid communication with the spool groove 41. A pair of exhaust ports 54, 55 are drilled through housing 14 and the valve sleeve so as to be in fluid communication with the spool grooves 40 and 42. Cylinder supply ports 56, 57 (sometimes called "motor supply ports") are drilled through the housing and the valve sleeve, and intercept sleeve grooves 30 and 31, respectively.

In Fig. 1 the valve spool 23 is shown in a central position wherein the spool lands 44 and 45 close off both sleeve grooves 30 and 31 from fluid communication with spool groove 41. It will be observed that spool groove 41 is always in communication with pressure port 53, and that when the spool valve shifts off center in one direction or the other, this pressure port 53 will be in communication with one, but only one, of the sleeve grooves 30 or 31, at any one time.

The valve just described is suitable for controlling a hydraulic ram of a type which includes a cylinder 58, a piston 59, and a rod 60. The ram is used to adjust the position of a cutting tool relative to a work piece in accordance with the spatial relationship of the stylus and a template 112. Hydraulic lines 61, and 61a are respectively connected to cylinder supply ports 56 and 57 for conducting the hydraulic fluid to opposite sides of the piston.

A hydraulic system for supplying hydraulic fluid under pressure includes a reservoir 62. The reservoir receives hydraulic fluid from a manifold 63 that is connected to exhaust ports 54 and 55. A pump 64 withdraws and pressurizes hydraulic fluid from the reservoir and supplies it through hydraulic line 65 to pressure port 53.

The rod 60 is connected to a cross-slide member 66 of a machine tool, which cross-slide is movable atop a carriage 67. The cylinder is mounted to the carriage 67. The carriage 67 is longitudinally movable on ways 68. The longitudinal movement is controlled by another hydraulic ram (not shown) mounted to the bed of the machine, which ram is controlled by the second spool valve 25 through a hydraulic system and valve such as that described above.

With further respect to the spool valve 10, a feature of this invention resides in the configuration of some of the aforesaid edges.

In the valve embodiment shown in Fig. 1, edge 48, for example, has a plurality of points such as points 69 and 70 which are axially spaced relative to each other so that as the spool is moved in the sleeve, the spool edge 48 changes its overlap with sleeve edge 35 progressively. For example, with respect to points 69 and 70, if the spool is moved to the left in Fig. 1 point 69 will overlap edge 35 and land 32 before point 70 reaches a similar axial position. The result of this is that, as the spool is moved gradually to the left, hydraulic fluid flow past edges 48 and 35 is gradually shut-off. This slowly throttles fluid flow from sleeve groove 30 into spool groove 40. Conversely, when the spool is moved to the right as shown in Fig. 1 there is a progressive opening of the passage between edges 35 and 48.

The term "point" is used herein in its geometrical sense of location, and not in the sense of a sharp extremity.

Valve spool control edges 49 and 50 are spaced apart by a distance substantially equal to the axial spacing of sleeve control edges 36 and 37. Edges 36 and 37 are the closest of the sleeve control edges to the pressure port. These four control edges lie in planes normal to central axis 28, and serve to substantially cut off fluid flow to both motor supply grooves when the spool is in its central position in the sleeve.

The second pair of spool control edges, edges 48 and 51, are equally canted to the central axis. Their points on these edges which are axially closest are spaced by a distance substantially equal to the spacing between sleeve edges 35 and 38. As the spool is initially moved from the central position, the rate of increase of flow area from pressure groove 41 to one of the motor supply grooves is greater than the rate of increase of flow area at one of edges 48 or 51. Yet, although the opening on the exhaust side at edge 48 or 51 is smaller in area than that at the pressure side, so that a true metering effect is exerted, still this metering effect is accomplished without requiring flow through a very thin circumferential slit. Instead, the opening is initially located at one side of the spool, with significant axial and perimetrical dimensions as opposed to a tiny perimetrical slit, so that the opening, even though small in total, is not apt to silt up.

Figure 4:
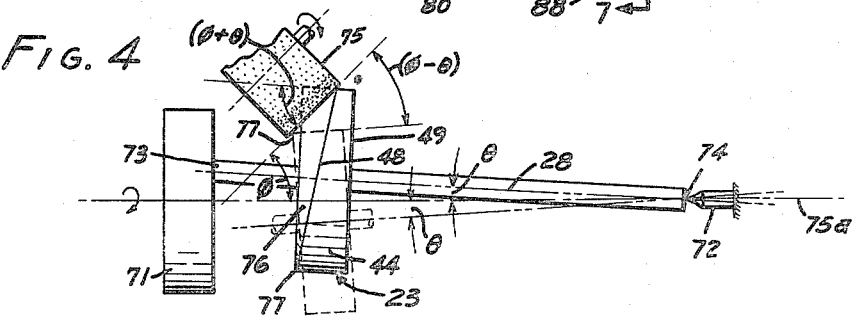
Fig. 4 shows a method for manufacturing a component part of Fig. 1.

In Fig. 4 there is shown a method for making the edge 48 which will further clarify the actual shape thereof. The valve spool 23, with the spool grooves already cut therein, is shown chucked between a head stock 71 and a tail stock 72 of a lathe. For clarity of disclosure, only one spool land is shown. End 73 of the valve spool is mounted off-center on the head stock while the end 74 is mounted on-center in the tail stock. The result of this eccentric mounting is that as the head stock is turned, the valve spool describes a cone in space. A grinding wheel 75 is placed with its cylindrical grinding surface at an angle $\phi$ to the line of centers 75a, while the axis 28 of the spool is disposed at an angle $\theta$ to the said line of centers. The head stock and grinder are rotated, and a shoulder 76 is ground on the spool which makes, an angle $(\phi+\theta)$ with the central axis of the spool, at the point of deepest cut and an angle of $(\phi-\theta)$ at the diametrically opposite edge. The greatest depth of cut by the grinder into the land 44 is made at the outermost portion thereof in the chucked position. It will be observed that at the innermost point 77 of the land in the chucked condition, the grinder does not cut. This condition is shown in dotted line. In the example shown, $\theta=4°$ and $\phi=45°$.

It will be recognized that the shoulder 76 that is formed by the grinder is a fragment of a cone whose conical angle is $2\phi$. Its intersection with the land 44 forms the edge 48 which edge 48 is an ellipse. This ellipse is inclined at an angle to the central axis 28 of the spool, but the elliptical shape of the edge 48 is not critical. Instead, the fact that the edge is tilted to the axis 28 is the operative feature in this embodiment, which provides axially spaced points, such as 69 and 70, on the edge 48 are spaced so that there is a succession of points axially disposed relative to the axis of the spool. Other edges such as 47, 49, 50 and 52 may be circular and perpendicular to the axis 28, while edge 51 may conveniently be the same as edge 48, except that it is oppositely inclined relative to axis 28. Edge 51 can be made by reversing the spool 23 end for end so that end 74 is in the head stock 73 during manufacture.

Figure 5:
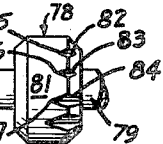
Figs. 5 and 6 are fragmentary plan views of alternate types of valve spools useful in the device of Fig. 1.

There are, of course, other means of forming an edge with the required property of axially spaced points. The illustration shown in Fig. 4 is the presently preferred, and apparently the simplest, means for grinding such a surface. Several other edges are also shown. For example, in Fig. 5, there is shown a fragment of a valve spool 78, which spool may be directly substituted for the valve spool 23 in the embodiment of Fig. 1. There is a spool groove 79 which forms a circular edge 80 with a land 81. A succession of notches 82, 83 and 84 are formed in said edge, each of which is deeper and extends a successively greater axial distance from the edge than its neighbor, so that notches 82, 83 and 84, have points 85, 86 and 87, for example, which are successively farther axially spaced from each other along the central axis of the spool.

Figures 6, 7:
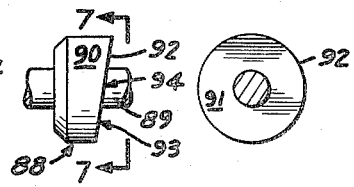
Fig. 7 is a partial cross-section taken at line 7—7 of Fig. 6.
Figure 8:
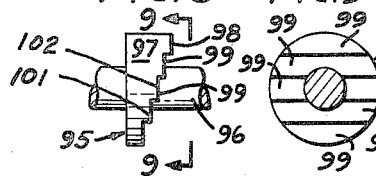
Fig. 8 is a fragmentary plan view of still another valve spool.
Figure 9:
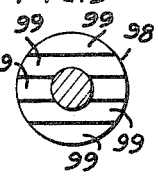
Fig. 9 is a partial cross-section taken at line 9—9 of Fig. 8.

Similarly, in Fig. 6 there is shown a fragment of a valve spool 88 which spool can be directly substituted for the valve spool 23 shown in Fig. 1, which valve spool has a spool groove 89 and a spool land 90. A planar face 91 is ground into the land so as to form an edge 92 which is elliptical in shape and inclined at an angle to the central axis of the spool, thereby having points such as 93 and 94 which are axially spaced from each other along said central axis. In Fig. 8 there is shown a fragment of a valve spool 95 which can be directly substituted for valve spool 23 in the valve of Fig. 1, said valve spool having a spool groove 96 and a spool land 97 thereon. The spool groove and spool land intersect at an edge 98. The edge 98 is stepped by steps 99 of successively greater axial depth which are formed in the shoulder of the valve spool such that points 101, and 102, for example, are axially spaced from each other.

Figure 10:
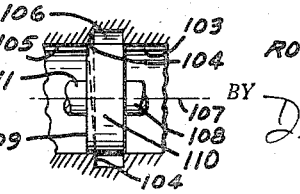
Fig. 10 is a fragmentary elevation, partly in cross-section of still another spool valve according to the invention.

It will be understood that an edge of any of the aforementioned configurations with axially spaced points may be disposed in the valve sleeve as well as in the valve spool. This is illustrated in Fig. 10 which is a fragmentary view of a valve sleeve 103 having an edge 104 at the intersection of a land 105 and a sleeve groove 106. This edge is elliptical and inclined at an angle to the central axis 107 of the valve sleeve. A valve spool 108 having a circular edge 109 at the intersection of spool land 110 and a spool groove 111 is slidably disposed within the sleeve so that the sleeve and land are axially shiftable relative to each other.

It will also be understood that any combination of the above-described edge configurations can be used in a single spool valve, if desired.

A complete description of the operation of a machine tool controlled by a tracer valve such as valve 11 may be obtained from the aforesaid Rosebrook patent. In short summary, the deflection of stylus 12 toward a template by an operator, or the movement of the stylus in the opposite direction by a template 112, in the operation of the machine, will cause the valve spool 23 to shift in the valve sleeve 27 so as to vary the flow of hydraulic fluid between the various grooves to and from the opposite sides of the hydraulic rams which move the machine bed.

For example, assume that the tip of the stylus is moved to the right in Fig. 1. Then the valve spool 23 will be moved to the left. At that time, pressure port 53 (which is in communication with spool groove 41) supplies pressurized hydraulic fluid through the opening between edges 36 and 49 so that pressurized hydraulic fluid flows into the sleeve groove 30 and thence through cylinder supply port 56 to one end of the hydraulic ram. Edge 48 of the spool overlaps edge 35 of the sleeve, and lands 32 and 44 also overlap, thereby removing spool groove 40 from communication with the sleeve groove 30.

At the same time, edge 51 is moved so that at least part of it no longer overlaps edge 38 of the valve sleeve, and fluid thereby flows from sleeve groove 31 past the aforesaid edges into spool groove 42, and thence out exhaust port 55 to the reservoir.

Pressure is thereby supplied to the right hand side of the ram to move slide 66 to the left, causing the template and stylus to approach each other, and also the workpiece W and the cutter C (turned by motor M) to approach each other. Reverse movement of the stylus causes a reverse movement of the slide 66. Valve 25 performs the same function for carriage 67.

It will be observed that the opening between the edges 38 and 51 gradually increases as the valve spool is shifted and this results in a throttling action which keeps an initial back pressure on the hydraulic ram. This back pressure, instead of a wide-open blow-down to exhaust maintains a positive throttling control over the movement of the machine tool and aids in preventing overshooting by limiting acceleration and deceleration rates of the machine tool slides and the workpiece.

When the stylus is moved in the other direction, the edges 38 and 51 begin to overlap more and more so as to close the hydraulic passage between them. This gradual throttling when the machine tool is nearly in an equilibrium condition also aids in avoiding overshooting.

It will be observed that in the spool valve shown in Fig. 1, edges 48 and 51 are on opposite sides of different lands and facing the exhaust ports so that a throttling back pressure action is exerted by one or the other of them, whichever way the spool valve is moved. Because fluid must leave one side of the cylinder in order for fluid to enter the other side, control over fluid flow to or from either side regulates the flow rate of the whole system. No matter which way the tool is moved in Fig. 1, there will always be a gradual application of pressurized fluid to one side of the cylinder when the machine is being accelerated and a throttling down on the exhaust line when the machine is nearing an equilibrium condition. Furthermore, the exhaust side of the hydraulic ram is maintained at a positive pressure. It has been found that this valve provides a more delicate control of large machine masses than has been possible with previous conventional type of spool valves.

It has been found that conventional circular edges, when used on all co-acting parts of the sleeve and spool have permitted quick opening of the valve. This has resulted in large acceleration and deceleration forces tending to inaccurate machine operations. Furthermore, in conventional valves, even a small movement of the spool results in a comparatively large flow cross-section. This tends to permit of high flow rate. The attempt of the tracer valve to correct the overshooting sometimes results in a chattering in the valve. The valve of this invention is substantially chatter-proof, inasmuch as it inherently provides for gradual increase and decrease of flow rates, so that no compensation, which may cause chatter, is needed.

An additional advantage of this device is that the balance of Bernoullian flow forces on the spool caused by flow past the edges 48 and 51 tends to prevent the valve spool from blowing to one end and instead tends to center the spool. This is a further aid to attaining accurately manufactured products.

The operation of the valve sleeves and valve spools shown in Figs. 5-10 inclusive are substantially the same as those shown in Fig. 1, an important operative feature thereof being the successive overlapping of axially spaced points on one edge with an opposed edge, as the valve spool and valve sleeve are moved axially relative to each other.

This invention is not to be limited to the embodiments shown in the drawing and described in the description, which are given by way of example and not of limitation, but only in accordance with the scope of the appended claim.

I claim:

A spool valve for controlling flow of liquid under pressure to a fluid motor for shifting portions of a machine tool in response to a command exerted by a tracer-template combination, said motor being of the class which has a pair of fluid connections, one for each side of the motor, direction of movement of the motor being controlled by said valve's action in selecting which of the connections is under pressure and which is under exhaust, and speed of the motor being controlled by said valve's metering of fluid flow out of the motor, said valve comprising: a valve sleeve, a circular cylindrical interior wall in said sleeve defining a spool passage having a central axis, a pair of spaced apart circumferential motor supply grooves in said wall, both of said grooves being bounded by circular control edges which lie in planes normal to the central axis, a pressure inlet port through the sleeve communicating with the spool passage between the motor supply grooves, motor supply ports through the sleeve communicating with respective ones of the motor supply grooves, said motor supply ports being adapted for connection with respective ones of the motor's fluid connections, a valve spool in said passage making slidable and fluid sealing contact therewith, said spool having a pair of outer circumferential lands, a pressure groove between and contiguous to the lands and intersecting therewith to form a first pair of circular control edges which lie in planes normal to the central axis and have substantially the same diameter and axial spacing apart as the two control edges in the sleeve which are adjacent to the pressure inlet port, said pressure groove being in fluid communication with said pressure inlet port, the first pair of control edges on the spool shutting off substantial pressure supply from both motor supply grooves when the spool is in a central position in the passage, said spool having a pair of exhaust grooves, one contiguous to the opposite side of each land from the pressure groove, and intersecting said lands to form a second pair of control edges which are continuous and curvilinear, lie in planes inclined to the central axis, and are substantially elliptical in plan, each of said second pair of control edges thereby having points axially spaced apart from each other along the central axis, the axially closest points on the two control edges of the second pair being axially spaced apart by substantially the same distance as the control edges of the motor supply grooves which are farthest removed from the pressure inlet port, the planes of the said second pair of control edges lying canted at equal angles to the central axis, whereby shifting of the spool from said central position connects the full periphery of the pressure groove to one of the motor supply grooves, while the other motor supply groove is connected to an exhaust groove past one of said second control edges over less than the full periphery thereof during initial movement of the spool from the central position, whereby the flow opening increases in cross-section area initially at a lower rate at the second control edges than at the first control edges.

References Cited in the file of this patent

UNITED STATES PATENTS

| | | |
|---|---|---|
| 2,544,209 | Wolcott | Mar. 6, 1951 |
| 2,702,529 | Doerfner | Feb. 22, 1955 |
| 2,705,829 | Mock | Apr. 12, 1955 |
| 2,745,624 | Turchan | May 15, 1956 |
| 2,783,745 | Stephens | Mar. 5, 1957 |